United States Patent
Neidhardt et al.

(10) Patent No.: US 7,768,910 B2
(45) Date of Patent: Aug. 3, 2010

(54) CALCULATIONS FOR ADMISSION CONTROL

(76) Inventors: Arnold L. Neidhardt, 574 Clubhouse Dr., Middletown, NJ (US) 07748; Brian A. Coan, 16AA Foxwood Dr., Morris Plains, NJ (US) 07950; Balakrishnan Dasarathy, 991 Sunset Rd., Bridgewater, NJ (US) 08807

( * ) Notice: Subject to any disclaimer, the term of this patent is extended or adjusted under 35 U.S.C. 154(b) by 957 days.

(21) Appl. No.: 11/346,655

(22) Filed: Feb. 3, 2006

(65) Prior Publication Data
US 2006/0239192 A1 Oct. 26, 2006

Related U.S. Application Data

(60) Provisional application No. 60/650,272, filed on Feb. 4, 2005.

(51) Int. Cl.
*H04J 1/16* (2006.01)

(52) U.S. Cl. .................. 370/230; 370/395.42

(58) Field of Classification Search ...... 370/229–236.1, 370/351, 389, 412, 395.1, 395.4, 395.42; 455/403, 422.1, 450; 709/230, 232, 235
See application file for complete search history.

(56) References Cited

U.S. PATENT DOCUMENTS

| | | | | |
|---|---|---|---|---|
| 5,838,922 A | * | 11/1998 | Galand et al. | 709/232 |
| 6,072,773 A | * | 6/2000 | Fichou et al. | 370/230 |
| 6,690,646 B1 | * | 2/2004 | Fichou et al. | 370/231 |
| 7,082,102 B1 | * | 7/2006 | Wright | 370/229 |
| 7,088,677 B1 | * | 8/2006 | Burst, Jr. | 370/229 |
| 7,385,920 B2 | * | 6/2008 | Zhang et al. | 370/229 |
| 2002/0107908 A1 | * | 8/2002 | Dharanikota | 709/203 |
| 2002/0120767 A1 | * | 8/2002 | Oottamakorn et al. | 709/235 |
| 2005/0190771 A1 | * | 9/2005 | Tan et al. | 370/395.21 |
| 2006/0198304 A1 | * | 9/2006 | Matefi et al. | 370/230 |

* cited by examiner

*Primary Examiner*—Kwang B Yao
*Assistant Examiner*—Obaidul Huq

(57) ABSTRACT

The present invention relates to on-line admission-control decisions. Specifically, the invention concerns general delay bounds for both deterministic and statistical cases for Differentiated Services (DiffServ) networks. More specifically, a detailed method of calculation in each case is followed by simpler methods of calculation that are more appropriate for on-line admission-control decisions. Relatively involved occupancy bound calculations for various service classes take place only at the time of network configuration or reconfiguration. At the time of admission control only simple occupancy threshold compliance calculations need to be performed. Concrete illustrations are provided for deriving bounds for the EF and AF classes provided by DiffServ. These results are applicable to both layer-3 networks that support DiffServ and layer-2 networks that support the more restricted class of service functions.

17 Claims, 2 Drawing Sheets

CALCULATIONS FOR ADMISSION CONTROL

CROSS-REFERENCE TO RELATED APPLICATIONS

This application claims the benefit of the filing date of U.S. Provisional Patent Application No. 60/650,272, filed Feb. 4, 2005, the disclosure of which is hereby incorporated herein by reference.

GOVERNMENT LICENSE RIGHTS

This invention was made with Government support under contract NBCHC030132 awarded by DARPA. The Government may have certain rights in this invention.

FIELD OF THE INVENTION

The present invention relates to on-line admission-control decisions. Specifically, the invention concerns general delay bounds for both deterministic and statistical cases for Differentiated Services (DiffServ) networks. More specifically, a detailed method of calculation in each case is followed by simpler methods of calculation that are more appropriate for on-line admission-control decisions. Relatively involved occupancy bound calculations for various service classes take place only at the time of network configuration or reconfiguration. At the time of admission control only simple occupancy threshold compliance calculations need to be performed.

BACKGROUND OF THE INVENTION

The seminal work of Parekh and Gallager, entitled "A Generalized Processor Sharing Approach to Flow Control in Integrated Services Networks, The multiple node case", EEEE/ACM Trans. Networking, vol. 2-2, pages 137-150, April 1994, has shown that it is possible to provide Quality of service (QoS) guarantees in an Internet Protocol (IP) network. Their techniques require certain fundamental additions to the networking infrastructure, including (1) admission control, (2) marking of admitted traffic so that the network routers and switches can associate it with an admitted flow, (3) policing of admitted traffic to make sure that it does not exceed its promised demand on network resources, and (4) managing and queuing traffic from admitted flows in certain ways in the core of the network to ensure that the service promised to admitted flows is not compromised by congestion in other portions of the network.

The initial QoS solution for IP networks, Integrated Services (IntServ), was directly inspired by the work of Parekh and Gallager, supra. That approach requires that network elements provide separate queuing for each admitted flow and entails the maintenance of per-flow state in each network element. IntServ approaches also tend to make admission decisions locally, rather than based on a network-wide policy.

Differentiated Services (DiffServ) is an approach to providing QoS to aggregate flows. It may provide satisfactory QoS without needing per-flow state in each network element. Additionally, in conjunction with a Bandwidth Broker for admission control, the DiffServ-based approach can support admission control that is driven by network-wide policies. Our delay bound techniques are readily applicable to layer-2 networks that support class of service (CoS), as CoS and DiffServ provide similar differentiated aggregate flow traffic treatment.

DiffServ uses aggregate flows in the sense that multiple flows share the same queue in the network core. Additional analysis is needed to bound the impact of aggregation of flows. Providing-end-to-end QoS requires the presence of individual network elements that have sufficiently strong QoS behavior, together with an analysis of network-wide accumulation of traffic bursts.

The analysis for aggregated flows relies on approaches where it is known that in the absence of bounds on the total number of network elements and on the maximum path length, it is possible to construct pathological scenarios in which no delay bound can be met. Fortunately, there are many situations where bounded delay can be achieved. These include networks where there is a known bound on the maximum number of hops taken by any flow. Many important networks, such as enterprise networks or networks confined to a ship or other vehicle are of bounded size and hence have a determinable upper bound on the number of hops taken by any flow.

Within a bounded network, there may be a small fraction of traffic that is so time-fragile that deterministic bounds on delay are important, a much larger fraction of less fragile, but still time-sensitive traffic for which approximate, probabilistic QoS is sufficient, and an even larger fraction for which best-effort delivery is completely satisfactory. To support this scenario of differentiated service requirements, without resorting to separate queues for individual flows, the network core would treat packets according to an aggregate classification. To respect the requirements of a more sensitive aggregate, the treatment could be one based on a strict priority, or it could be based on weighted sharing discipline. In any case, admissions need to be controlled appropriately while accounting correctly for the treatment of the aggregates.

Motivated by this scenario, the admission calculations in the present invention address this need within a general framework of any number of priority classes and, within each priority class, any number of weighted-share sub-classes.

SUMMARY OF THE INVENTION

Each session is imagined as beginning with an admission request that provides enough information to determine the session's service requirements and some features of the session's traffic, such as policing or shaping parameters $(\sigma, \rho)$ bounding bursts and rates, with the meaning that the amount of that session's traffic entering the network during any interval of duration t will never exceed $\sigma+\rho t$. In general, admission decisions are combined with routing decisions, but the following description will be phrased as if an admission decision is to be determined for a given session over a given route.

For the most efficient use of the network's resources that serve the traffic directly, the admission decision should be based on predictions of service quality that are as accurate as possible. Yet, because of the need not to delay these decisions too greatly, accuracy must be sacrificed, and the corresponding calculations are basically split between relatively complicated off-line determinations of suitable thresholds and, during the admission decisions themselves, relatively simple on-line comparisons of these thresholds with elementary combinations of traffic descriptions. Naturally, the off-line calculations must ensure that the thresholds are chosen so that service quality is assured as long as the admission decisions respect the thresholds. Of course, in this case, the loss of accuracy, that is created by the introduction of these thresholds, takes the form of loss of network efficiency: more admission requests are denied.

Different sorts of calculations arise for dealing with deterministic worst-case service requirements and for dealing with more statistical requirements. Naturally, the deterministic version concerns a guarantee about actual delays (GAD). To avoid impractical complexities, however, the statistical version is neither a guarantee about actual statistics (GAS), which would just be a more complicated worst-case guarantee, nor a guarantee about actual statistical expectations (GASE), which would require complex calculations of the implications of multitudes of cases beyond just the worst case. Instead, the statistical version described below is merely a guarantee about certain estimates of statistical expectations (GESE), where the estimates do include some pessimistic features in the conservative direction to take serious account of the traffic fluctuations that are possible.

The primary advance made by the present invention both for GAD and GESE is that the novel formulation is set in a more general context supporting any number of priority classes and within each priority class any number of weighted-fair queuing service classes. The scheme explicitly takes into account all the individual traffic streams that are presently in progress from all classes together with the stream whose admission is being considered. The main technique used in an earlier work to increase utilization bounds is one of dividing a class into several subclasses, each subclass supporting traffic with different deadline values in place of a single more stringent deadline for the entire class. However, implementation of multiple priorities in a single class is not readily realizable in commercial routers and switches.

Calculations according to the present invention for GESEs may be compared with earlier work. In comparison with those earlier works that come closest to ours, our calculations take more seriously the fluctuations that can arise while conforming to traffic descriptors. Thus, to deal with the possible fluctuations in the arrivals over a particular interval from independent streams of an aggregate, the present analysis relies on exponential moments for certain on-off distributions for the individual streams, where the on-off distribution for a given stream is the one that maximizes the exponential moments, among all distributions that respect the given bounds on the peak and the mean for the given stream in the given interval. In contrast, the prior art analysis, that comes closest to ours, relies on Gaussian approximations, where, for each stream, the corresponding variance is taken from the distribution that maximizes the entropy, among the distributions matching the given peak and mean. First, of course, the use of Gaussian approximations is more hopeful than conservative. Yet, a more disquieting concern is that these maximum-entropy variances are all smaller than the variances of other distributions that are consistent with the given peaks and means. In more detail, the maximum-entropy distribution is continuous, so it is not an on-off distribution, and the on-off distribution is the one that maximizes the variance. In this sense, the prior analysis is less serious about the fluctuations that can possibly arise.

DETAILED DESCRIPTION

Figure 1:
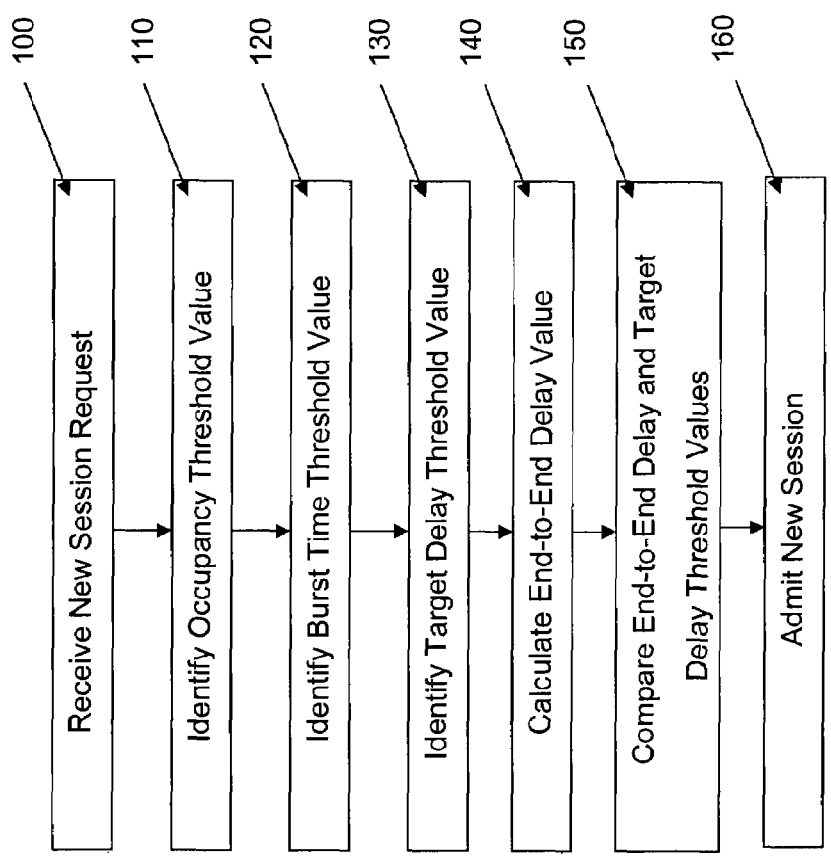
FIG. 1 is a flow diagram illustrating operations performed at a device in accordance with a representative embodiment.

In the following description, a network is imagined as serving sessions that can be partitioned into a few priority classes, which, in turn, can be partitioned into a few weighted fair queuing (WFQ) sub-classes. For instance, the priorities might be high, medium, and low, with high priority intended for real-time applications that could require a deterministic guarantee on delay, with low priority being basically best-effort service that requires no guarantee at all, and with medium priority intended for non-real-time applications that still require some kind of guarantee, such as a statistical guarantee. In this instance, the high-priority packets would have absolute, though non-pre-emptive, priority over the packets of the lower-priority classes, while the medium-priority packets would have absolute priority over low-priority packets. Moreover, continuing with this instance, the medium-priority applications are imagined as being partitioned into WFQ sub-classes or types, with each type getting a guaranteed fraction of the medium-priority effort of any congested resource, typically a link. More generally and abstractly, let L be the set of links in a network, where, for this description, the links are imagined as being the only network resources that could ever become congested and create queuing delays. For each link $l \epsilon L$, let $C(l)$ be the capacity or service rate of the link. In addition, for the link l, it is convenient to introduce the notion of an effective propagation delay for the various packets traversing the link l, that represents the time between a packet ending its transmission onto the source end of link l and the same packet arriving at the queue for the next link on its route. So this time can vary from packet to packet, as the different packets deal with quirks in operating-system latencies at the next node. The purpose of including these latencies into the effective propagation delays is because the variations in these latencies are practically independent of the traffic, and they turn out to have the same effect on the analysis. Accordingly, let $\Delta(l)$ be the minimum possible value for the effective propagation delay of link l, and let $J(l)$, the "jitter", be the difference between the maximum and minimum possible values for the effective propagation delay of link l. Incidentally, the importance of distinguishing the portion $J(l)$ of the bound $\Delta(l)+J(l)$ on the effective propagation time of link l is that $J(l)$, unlike $\Delta(l)$, can contribute to increasing the sizes of bursts in streams traversing l. In addition, let M be the maximum size of a packet.

Let K be the set of priority classes. This set of priority classes is totally ordered, with each packet of one class having absolute service-order priority over packets of lower classes. For each class $k \epsilon K$, let $T_k$ be the set of service types within class k. Reflecting the fact that a given service type belongs to just one priority class, the sets $T_k$ are disjoint. Within class k, the packets of the different types in $T_k$ are served according to a WFQ allocation of the class-k effort at any link. For each link $l \epsilon L$, for each type $\tau \epsilon T_k$, let $w(\tau, l)$ be the weight that type $\tau$ gets at link l, so that the same type can get different weights at different links (which makes sense when different links could be handling different mixtures of the same traffic types). Here, the weights are taken to be normalized, so that $$\sum_{\tau \epsilon T_k} w(\tau, l) = 1$$

for any $k \epsilon K$ and any $l \epsilon L$. For each type $\tau \epsilon T_k$, let $S_\tau$ be the set of traffic streams of type $\tau$ that are imagined as being in progress for the purpose of an admission-control decision (so these streams include the session requesting admission, as well as the sessions that are really already in progress). Reflecting the fact that a given stream belongs to just one service type, the sets $S_\tau$ are disjoint. For each stream $s \epsilon S_\tau$, let $H(s)$ be the number of hops in the route of s, and for any j with $0 \leq j < H(s)$, let $\lambda(j,s)$ be the j-th link on the route of s. Also, let $\sigma_s$ and $\rho_s$ be the burst and rate shaping parameters that bound the traffic of stream s, at its entry into the network, i.e. as it arrives to queue at link $\lambda(0,s)$.

Given this information about the network's configuration and traffic, the task for the calculations is to determine whether each session's service requirement is met.

The following are two calculation schemes that could be used, in principle, by an admission-control procedure to support a GAD (guarantee about actual delay). The first scheme is closely related to earlier work, though the earlier work deals with an abstract rate function whose identification for a service type at a low priority class implicitly requires some preliminary calculations for the performance of higher priority classes. Here, however, the relevant calculations for class-dependent performance are given explicitly, except that no reference is ever actually made to any abstract rate function. In any case, one of the calculation schemes being presented here takes explicit account of all the individual traffic streams that are presently in progress, together with the stream whose admission is being considered, though the complexity of the scheme renders it impractical for on-line admission control. A second scheme is obtained from the first by the introduction of thresholds, such as occupancy thresholds, where the idea is that most of the calculations are to be done off-line to identify the thresholds, so that only simple comparisons with thresholds need to be done on-line during admission control.

The next step is to try to identify several kinds of suitable bounds. For any stream s, for any $j<H(s)$, one of the desired quantities is a value $\sigma_{s,j}$ that can be used as a bound on the burstiness of stream s as it arrives at the queue for link $\lambda(j,s)$. Naturally, for $j=0$, $\sigma_{s,0}=\sigma_s$ is a suitable choice, but for larger values of j, some account must be taken for the possibility of stream s having acquired additional burstiness in traversing the hops leading up to hop j from the point at which stream s entered the network. Next, for any type $\tau$ of stream, and for any link $l \in L$, the other desired quantity is a value $D_\tau(l)$ that can be used as a bound on the queuing delay that a type-$\tau$ packet could encounter at link l. Intuitively, one can understand how potential delays along the early hops taken by a stream can increase the burstiness of the stream as it arrives at later hops, and one can understand how the burstiness of the streams arriving at a link can increase the queuing delays at that link. Next is formalization of these intuitions into relations for governing suitable choices for the quantities $\sigma_{s,j}$ and $D_\tau(l)$.

The easier intuition to formalize is the one relating to a stream's burstiness increasing as it traverses more hops. Thus, consider a stream s of type $\tau$, and consider some hop $j<H(s)$. Let $l=\lambda(j,s)$, the link being traversed by stream s at hop j. Suppose that $\sigma_{s,j}$ bounds the burstiness of stream s as it enters the queue for link l, and suppose that $D_\tau(l)$ is a bound on the queuing delay that a type-$\tau$ packet can encounter at link l. To see how bursty stream s can be as it leaves link l, suppose that one packet of stream s is delayed in queue by the maximal amount $D_\tau(l)$ and also encounters the maximal jitter $J(l)$, while a later packet encounters neither queuing nor jitter delay at l. Comparing the interval separating the packets upon entering the queue with the interval after exiting the influence of the link, one finds that the latter interval is shorter than the former by $D_\tau(l)+J(l)$, which translates into a potential increase in burstiness of $\rho_s(D_\tau(l)+J(l))$.

Thus, $$\sigma_{s,j+1}=\sigma_{s,j}+\rho_s(D_\tau(\lambda(j,s))+J(\lambda(j,s))) \quad (1)$$

is a suitable formalization of the intuition of how variable delays can increase burstiness.

The intuition of how bursts contribute to delays is much more difficult to formalize in the case of multiple types and classes of traffic, because of various complications. One complication is that a packet at one priority class can be delayed by later arrivals at higher priorities. The delay can even be from later arrivals at the same priority, if these arrivals belong to competing WFQ types. Finally, the fact, that traffic comes in discrete packets, rather than in continuous fluid, adds two more complications, one complication being in the merely approximate success of WFQ in isolating delays to one service type from the effects of traffic bursts in other service types, and the other complication being that a high-priority packet can be delayed by a low-priority packet that begins its transmission just before the high-priority packet arrives. Eventually, a formula, that expresses how bursts contribute to delays, must account for all of these complications.

To begin to express these complications quantitatively, it helps first to identify aggregate rate and burst bounds, based on bounds for the individual streams. Thus, for any service type $\tau$ and any link l, let $$\rho_\tau(l) = \sum_{s \in S_\tau} \sum_{0 \leq j < H(s):\lambda(j,s)=l} \rho_s,$$

and $$\sigma_\tau(l) = \sum_{s \in S_\tau} \sum_{0 \leq j < H(s):\lambda(j,s)=l} \sigma_{s,j}.$$

Then, for any priority class k, let $$\rho_{>k}(l) = \sum_{k' \in K:k'>k} \sum_{\tau' \in T_{k'}} \rho_{\tau'}(l),$$

and $$\sigma_{>k}(l) = \sum_{k' \in K:k'>k} \sum_{\tau' \in T_{k'}} \sigma_{\tau'}(l).$$

Then the service rate available to priority class k is $C_k(l)=C(l)-\rho_{>k}(l)$, which is strictly greater than zero, if admission control is doing its job. Of course, only the amount $w(\tau,l)C_k(l)$ is reliably available to a particular service type $\tau \in T_k$.

For the subtler complications, it helps to identify corresponding indicators. First, for any priority class k, let $l'_k=I$ (k is not the lowest priority), where, for any clause c, I(c) is the indicator of clause c, which is 1 if c is true and 0 if c is false. This indicator is related to the subtle complication that even high-priority packets can experience up to a packet's worth of delay from the influence of a low-priority packet at the start of a high-priority busy period, if the higher-priority packets cannot preempt the lower-priority packet, provided that there is a lower priority class. Next, for any priority class k and any service type $\tau \in T_k$, let $I_\tau=I(\{\tau\} \neq T_k)$. The corresponding subtle complication here is that WFQ, as a discrete approximation to an idealized partition of continuous service, can miss its target allocation by up to a packet's worth, provided that there is more than one service type in the priority class. Combining all the considerations above, one finds that the intuition of how suitable choices for delay bounds can be derived from suitable burstiness bounds can be expressed as $$D_\tau(l) = \frac{Ml'_k + \sigma_{>k}(l)}{C_k(l)} + \frac{M\tilde{\iota}_\tau + \sigma_\tau(l)}{w(\tau, l)C_k(l)}. \quad (2)$$

The intuitive relations between bursts and delays have now been formalized in the relations (1) and (2). The problem with these relations, however, is the circularity that they typically generate for the dependencies among the quantities of interest. In other words, there is typically no simple order in which one can first identify the values for some "earlier" quantities and then use the relations successively to identify values for the "later" quantities one step at a time. Instead, many of the identifications have to be made simultaneously.

The following description uses the relations identified previously to construct a scheme of calculations in terms of individual streams. Unfortunately, the scheme seems too complicated for on-line admission control, which is why the following description adds a modification in terms of thresholds, so that on-line calculations can be simple. The task is to identify choices for the quantities $\sigma_{s,j}$ and $D_\tau(l)$ that solve simultaneously the relations of the previous paragraphs, primarily (1) and (2).

To organize this kind of simultaneous solution, it helps first to use the relations (1) to express all the burst bounds $\sigma_{s,j}$ explicitly in terms of the delay bounds $D_\tau(l)$. Thus, recalling that $\sigma_{s,0} = \sigma_s$, one finds that, for any service type $\tau$, for any stream $s \in S_\tau$, for any $j < H(s)$, $$\sigma_{s,j} = \sigma_s + \rho_s \sum_{0 \le j' < j} [D_\tau(\lambda(j', s)) + J(\lambda(j', s))]. \quad (3)$$

The idea now is to use (3) to eliminate all the burst bounds $\sigma_{s,j}$ in favor of the delay bounds $D_\tau(l)$. As a result, (2) is modified to express $D_\tau(l)$ in terms of other delay bounds $D_\tau(l')$ for the same service type $\tau$ at other links $l'$, other delay bounds for higher priority classes, and still other influences that are independent of any delay bounds. So the delay bounds can indeed be identified in a manner that is at least partially ordered: the delay bounds for higher priorities can be identified before any delay bounds for lower priorities are considered. Moreover, within a single priority class, the delay bounds for the different service types can be identified independently.

In accordance with this procedure, the resulting modification of (2) takes the form $$D_\tau(l) = b_\tau(l) + \sum_{l' \in L} \Gamma_\tau(l, l') D_\tau(l'), \quad (4)$$

where the quantities $b_\tau(l)$ capture the influence of intrinsic bursts and jitters, as well as delay bounds for higher priorities, while $\Gamma_\tau(l,l')$ captures the influence of $D_\tau(l')$ on $D_\tau(l)$. Explicitly, these quantities are given by $$b_\tau(l) = \frac{Ml'_k + \sigma_{>k}(l)}{C_k(l)} + \frac{M\tilde{\iota}_\tau + \sigma_\tau^J(l)}{w(\tau, l)C_k(l)},$$

where

-continued $$\sigma_\tau^J = \sum_{s \in S_\tau} \sum_{0 \le j < H(s): \lambda(j,s)=l} \sigma_s + \sum_{s \in S_\tau} \sum_{0 \le j' < j < H(s): \lambda(j,s)=l} \rho_s J(\lambda(j', s)),$$

and $$\Gamma_\tau(l, l') = \frac{\sum_{s \in S_\tau} \sum_{0 \le j' < j < H(s)} \rho_s I(\lambda(j', s) = l' \ \& \ \lambda(j, s) = l)}{w(\tau, l)C_k(l)}.$$

The formulation (4) can be regarded as the matrix equation $$D_\tau = b_\tau + \Gamma_\tau D_\tau, \quad (5)$$

if $D_\tau$ and $b_\tau$ are regarded as column vectors with index set L, and if $\Gamma_\tau$ is regarded as a square matrix with index set L×L. Hence, if the matrix $I - \Gamma_\tau$ is invertible, where I here is the L×L identity matrix, then the solution to (5) is $D_\tau = (I-\Gamma_\tau)^{-1}b_\tau$. Yet, invertibility alone is insufficient for the solution to be meaningful, because, with all the entries of $\Gamma_\tau$ being non-negative, the equation (5) can be used to establish finite, positive bounds on delays only if all the entries of the matrix $(I-\Gamma_\tau)^{-1}$ are also non-negative, which turns out to be equivalent to the condition that the power series $$\sum_{n=0}^\infty \Gamma_\tau^n$$

converge to $(I-\Gamma_\tau)^{-1}$. That is, meaningful finite positive bounds cannot be established in this way unless the relevant occupancies entering the terms of $\Gamma_\tau$ are sufficiently small (though the precise version of the condition is, as was just noted, the convergence of the power series).

Assuming that the desired bounds $D_\tau(l)$ on individual link delays are produced, they are easily combined into bounds on end-to-end delays, at least in a conceptual sense. Explicitly, for any individual session S of type $\tau$ within priority class k, one can guarantee that the maximum end-to-end delay will not exceed $$D_s = \sum_{0 \le j < H(s)} [D_\tau(\lambda(j, s)) + \Delta(\lambda(j, s)) + J(\lambda(j, s))],$$

and the maximum end-to-end delay variation will not exceed $$D'_s = \sum_{0 \le j < H(s)} [D_\tau(\lambda(j, s)) + J(\lambda(j, s))].$$

Presumably, the criteria for satisfactory service to a stream s involve tolerances $\delta_s$ and $\delta'_s$ for maximal delays and delay variations. Accordingly, as long as the inequalities $D_s \le \delta_s$ and $D'_s \le \delta'_s$ are all satisfied, the calculations justify admitting all the streams.

As an alternative second scheme to the first scheme that was just described, thresholds are introduced to allow for simple on-line comparisons in making admission decisions, where the idea is that the complicated off-line calculations identifying the thresholds would be done ahead of time.

Primarily, the thresholds considered here are occupancy thresholds, but the scheme here also relies on a bound h on all the hop counts H(s) of all the streams s that will ever be admitted, as well as bounds $T_\tau$ on the burst times for the streams of type $\tau$, with the meaning that, for any stream s of type $\tau$ that is ever admitted, $\sigma_s \leq \rho_s T_\tau$. In a strict sense, the weights $w(\tau,l)$ are also thresholds that should be tuned to optimize the admission of anticipated traffic, but the emphasis here is on the new thresholds that do not appear in the calculations of the first scheme that was described above. Accordingly, the emphasis is on the occupancy thresholds $\alpha_k$ where $\alpha_k$ can be regarded as the occupancy allocated to priority class k, but its more precise meaning is that, during an on-line admission decision for a stream s of type $\tau$ of priority class k, the stream s would be rejected if, for any link 1 on the route of s, the admission of s would cause $\rho_\tau(l)$ to exceed $\alpha_k w(\tau,l)C(l)$.

An implication of basing admission decisions on thresholds for aggregates rather than on the individual streams is that, once one has to deal with a situation for a given link in which the streams routed through that link could have been routed almost arbitrarily through other links in the network, it ceases to make much sense to try to identify distinct delay bounds $D_\tau(l)$ for different links l. Instead, for a given service type $\tau$, it is appropriate to identify just a single delay bound $D_\tau$ that applies to all the links. An implication of this change is that the modified version of the matrix equation (5) is a scalar equation.

The specific quantities, that enter the calculation of the delay bound ($D_\tau$) for a service type $\tau$ at priority class k, are the following. First, for any priority class k' higher than k, let $D_{k'} = \max_{\tau' \in T_R} D_{\tau'}$, and $T_{k'} = \max_{\tau' \in T_R} T_{\tau'}$.

Next, let $$\alpha_{>k} = \sum_{k' \in K} \alpha_{k'}.$$

Next, introduce the "averages"

$$D_{>k} = \alpha_{>k}^{-1} \sum_{k' \in K: k' > k} \alpha_{k'} D_{k'}$$

and $$T_{>k} = \alpha_{>k}^{-1} \sum_{k' \in K: k' > k} \alpha_{k'} T_{k'}.$$

Also, let $\bar{J} = \max_{l \in L} J(l)$. Finally, for each link $l \in L$, let $$\tilde{b}_\tau(l) = \frac{M}{C(l)(1-\alpha_{>k})}\left[t'_k + \frac{t_\tau}{w(\tau,l)}\right] + \frac{\alpha_{>k}}{1-\alpha_{>k}}\left[T_{>k} + (h-1)(D_{>k}+\bar{J})\right] + \frac{\alpha_k}{1-\alpha_{>k}}\left[T_\tau + (h-1)\bar{J}\right],$$

and set $$\hat{b}_\tau = \max_{l \in L} \tilde{b}_\tau(l).$$

These quantities now allow for an easy determination of the delay bound $D_\tau$, because the modified version of the matrix equation (5) is the scalar equation $$D_\tau = \hat{b}_\tau + \frac{\alpha_k(h-1)}{1-\alpha_{>k}} D_\tau.$$

Thus, as long as $\alpha_k(h-1)/(1-\alpha_{>k}) < 1$, then the individual link delays for type-$\tau$ streams are all bounded by $$D_\tau = \left[1 - \frac{\alpha_k(h-1)}{1-\alpha_{>k}}\right]^{-1} \hat{b}_\tau.$$

Bounds on the end-to-end delays are then identified rather routinely. First, let $$\hat{\Delta} = \max_s \sum_{0 \leq j \leq H(s)} \Delta(\lambda(j,s)),$$

where an assumption being made here is that the longest route is the same for all service types. Then a bound on the longest end-to-end delay for all type-$\tau$ streams is given by $\hat{D}_\tau = \hat{\Delta} + h(D_\tau + \bar{J})$, while a bound on the longest delay variation is $\hat{D}'_\tau = h(D_\tau + \bar{J})$. Accordingly, if there are tolerances $\delta_\tau$ and $\tau'_\tau$ on the maximal end-to-end delay and delay variation for type-$\tau$ streams, then the point of the off-line calculations is to select choices for the thresholds like $\alpha_k$ to ensure that $\hat{D}_\tau \leq \delta_\tau$ and $\hat{D}'_\tau \leq \delta'_\tau$ for all service types $\tau$.

The following illustrations deal with 4 service types in total, distributed among 3 priority classes: a high-priority Expedited Forwarding (EF) type, two medium-priority Assured Forwarding (AF) types, AF0 and AF1, and a low-priority best-effort type that really has no delay target. The service rate of each link will be taken to be C(l)=1 Gb/s. The maximum packet size will be taken to be M=12,000 bits, corresponding to 1500 bytes. The bound on the number of hops in a route will be taken to be h=10, so h−1=9. The bound on operating-system jitters at each hop will be taken to be $\bar{J}$=1 ms. The bound on the propagation delay along the longest route in the network will be taken to be $\hat{\Delta}$=4 µs, corresponding to an image of a 300-meter ship networked with fiber having an index of refraction of 2, but with sloppy enough wiring and routing to double the propagations that might otherwise be obtained. The burst times of the various service types will be taken to be $T_{EF}$=2 ms, $T_{AF0}$=10 ms, and $T_{AF1}$=50 ms. As for the WFQ weights distinguishing the AF types, they will be taken to be w(AF0,l)=0.6 and w(AF1,l)=0.4 at all links l. Finally, the target delays will be taken to be $\delta_{EF}$=125 ms, $\delta_{AF0}$=500 ms, and $\delta_{AF1}$=1 second.

The computations for the high-priority EF type are rather direct. First, in terms of milliseconds, $\hat{b}_{EF}$=11$\alpha_{EF}$+0.024. Hence, $$D_{EF} = \frac{\hat{b}_{EF}}{1-9\alpha_{EF}} = \frac{11\alpha_{EF}+0.024}{1-9\alpha_{EF}},$$

so $$\hat{D}_{EF} = \hat{\Delta} + h[D_{EF}+\bar{J}] = 10.004 + \frac{110\alpha_{EF}+0.24}{1-9\alpha_{EF}}.$$

With $\alpha_{EF}$=0.1, the result is $\hat{D}_{EF}$=122.404 ms, which does not exceed the target $\delta_{EF}$=125 ms.

The computations for the AF types are similar, except for dealing with the extra complication of dealing with the effects of the higher-priority EF type. In particular, one must account for $$1 - \alpha_{>AF} = 0.9, \quad \frac{a_{>AF}}{1 - \alpha_{>AF}} = \frac{1}{9},$$

and $D_{EF}$=11.24 ms. First, for each of the two AF types $\tau$, $$\hat{b}_\tau = \frac{0.12}{9}\left(1 + \frac{1}{w(\tau)}\right) + 12.24 + \frac{2}{9} + 10\alpha_{AF}\left(\frac{T_\tau}{9} + 1\right).$$

Next, $D_\tau = \hat{b}_\tau/(1-10\alpha_{AF})$. Finally, $\hat{D}_\tau = 10.004 + 10\hat{b}_\tau/(1-10\alpha_{AF})$. With $\alpha_{AF}=0.06$, $\hat{D}_{AF0} \approx 354$ ms, while $\hat{D}_{AF1} \approx 421$ ms, which meet the service targets (and type AF1 even meets the target for AF0). Incidentally, notice that the choice of $\alpha_{AF}=0.07$ would violate the target for AF0.

Analogous with the previous discussion of the calculations for GADs there will now be a similar discussion of calculations for GESEs (guarantees about estimates of statistical expectations). The aim here is not to provide a guarantee on actual statistical expectations; instead, for the sake of practicality, the aim is merely to provide a guarantee for rough approximations to such statistical expectations. Before identifying the specific approximations entering the guarantee, however, the first step is to specify the service targets that will be considered. In particular, the calculations here will be developed on the conception that for a stream s of service type $\tau$, most of the end-to-end delays are to be bounded by some target $\delta_\tau$, with some tolerance $\epsilon_\tau$ for the fraction of packets with end-to-end delays above $\delta_\tau$, where $\epsilon_\tau$ might be on the order of $10^{-3}$. Now, for each stream s, the maximum value, that can be attained by the effective end-to-end propagation delay, is $$\overline{\Delta}_s = \sum_{0 \leq j < H(s)} [\Delta(\lambda(j,s)) + J(\lambda(j,s))].$$

Thus, for a stream s of type $\tau$, it makes sense to admit s only if $\overline{\Delta}_s < \delta_\tau$, and then only if one expects that the end-to-end queuing delay encountered by a packet of stream s to exceed $\delta_s = \delta_\tau - \overline{\Delta}_s$ with a probability no greater than $\epsilon_\tau$. This formulation, of comparing $\epsilon_\tau$ with an estimate of the probability for a queuing delay to exceed $\delta_s$, is basically the version of the service target to be supported by the calculations to be developed here.

The next step is to list the simplifying approximations to be made. As one example of such a simplifying approximation, the analysis here will assume that the queue sizes at different links are independent. Another simplification is to assume that the different streams are independent, which is at least more reasonable, though perhaps not entirely accurate, if different streams turn out to support different aspects of a single application e.g. voice and video channels of a single conversation. In addition, another simplifying approximation is to treat the traffic being generated by the different streams as forming, not just independent stochastic processes, but stationary stochastic processes. Yet another aspect of the simplifying approach to be used in this analysis, is to employ the philosophy of large-deviations analysis in paying attention only to the most likely ways of having bad things happen in the service of a stream, or, more formally, of estimating the probability of a union as being roughly equal to the maximum of the individual probabilities.

Another simplifying approximation, that will be made here, is to assume that the burstiness of a stream's traffic as it arrives at one link on its route is the same as the burstiness at other links along the route. Indeed, it is the tracing of the potential increase in the burstiness of a stream along the successive links of the route that creates most of the complexity in the worst-case analysis. So the analysis here will basically ignore this complexity.

The simplifications listed above are all in the optimistic direction (i.e. they tend to underestimate the service-degrading possibilities of the real network), so the next simplifications will be in the conservative direction. One of these simplifications is to replace probabilities by certain exponential moments, where the simplification occurs if the probability has the form $P(S>s)$, where $s = \Sigma_i X_i$ is the sum of independent random variables $X_i$ whose distributions are relatively easy to manipulate. Formally, the relevant bound is $P(S \geq s) \leq E e^{p(S-s)}$ for any $p \geq 0$, which is valid because, whenever $S \geq s$, $1 \leq e^{p(S-s)}$, and whenever $S<s$, $0<e^{p(S-s)}$. Here, the simplification is that $P(S \geq s)$ is typically very complicated to compute, whereas $Ee^{pS}$ is simply the product of the $Ee^{pX_i}$.

In the calculations for the GESE, $X_i$ will often be the random amount of traffic being generated by a particular stream s during a particular time interval of duration t, so the knowledge available about $X_i$ will include certain bounds on $X_i$, but will not include all the details of the distribution of $X_i$. Basically, if the burst-rate pair $(\sigma, \rho)$ is known for the stream s, then the values of the random variable $X_i$ are known to be confined to the interval $[0, \sigma+\rho t]$. Of course, if $X_i$ is taken from a stationary process that is governed by the pair $(\sigma,\rho)$, then $EX_i \leq \rho t$. Now, regardless of the value of $p>0$, of all the distributions of random variables X that are confined to some interval $[0,B]$ with $B>0$, and that have a mean bounded by some prescribed bound $m \in [0,B]$, the distribution, that maximizes the exponential moment $Ee^{pX}$, is the on-off distribution that assigns probability $$\frac{m}{B} \text{ to } B$$

and $$1 - \frac{m}{B} \text{ to } 0.$$

Accordingly, in the calculations to be presented later, the exponential moment $Ee^{pX_i}$ will be estimated by the quantity $$\mu(p; t, \sigma, \rho) = \frac{\rho t}{\sigma + \rho t} e^{p(\sigma + \rho t)} + \frac{\sigma}{\sigma + \rho t}$$
$$= 1 + \frac{\rho t}{\sigma + \rho t}(e^{p(\sigma + \rho t)} - 1).$$

As for the specific considerations motivating specific calculations, recall first that the service target for a stream s of type $\tau$ is that the end-to-end queuing delay not exceed $\delta_s$ with a probability greater than $\epsilon_\tau$. Evidently, the main task is to identify the probabilities for large queuing delays. Of course, the end-to-end queuing delay along a route is simply the sum of the individual queuing delays at each of the links along the route. Formally, let $D_j$ be the random queuing delay at link $\lambda(j,s)$. Then $\Sigma_j D_j$ is the end-to-end queuing delay. Hence, if the end-to-end queuing delay exceeds $\breve{\delta}_s$, then for some sequence of values $d_j \in [0,\infty)$ with $0 \leq j < H(s)$, where $\Sigma_j d_j = \breve{\delta}_s$, $D_j$ must be at least as large as $d_j$ for each j. In view of the simplifying approximation procedure of treating the performance at different links as being independent, the corresponding probability will be approximated as $\Pi_j P(D_j \geq d_j)$. Moreover, in view of the large-deviations procedure of approximating the probability of a union as the maximum of the individual probabilities, the procedure here will be to make the approximation $$P\left(\sum_j D_j > \breve{\delta}_s\right) \approx \sup_{d \in [0,\infty)^{H(s)}: \sum d = \breve{\delta}_s} \prod_{0 \leq j < H(s)} P(D_j \geq d_j),$$

i.e. to pick the sequence $d=\{d_j\}$ to maximize the expression $\Pi_j P(D_j \geq d_j)$. In any case, most of the rest of the development of this approximation will be concerned with estimating the individual factors $P(D_j \geq d_j)$.

In considering the queuing delay to a "test" packet of stream s of type T in priority class k at a link $l=\lambda(j,s)$ on its route, let time 0 be the time at which the packet arrives at the queue for link l. Naturally, this test packet is delayed by all the type-$\tau$ packets in queue ahead of the test packet, as well as all the higher-priority packets that either are in queue ahead of the test packet or arrive later, but still before the test packet is served. As for the other WFQ types $\tau'$ of class k that are competing with type $\tau$, these arrivals can also delay the test packet even by arriving after the test packet, but only to the extent of the bandwidth allocated to these other types. Let $t_j$ be the age of the busy period, relative to classes k and higher, that is in progress at time 0. Let $A_{>k}$ be the random amount of higher-priority traffic that arrives at link l during the interval $(-t_j, d_j]$. If $A_{>k} \geq C(l)(t_j+d_j)$, then the link serves higher-priority traffic exclusively during this interval, unless the amount $A_{>k}$ arrives primarily during the latter part of the interval (thereby allowing the link to serve some lower-priority traffic before the bulk of the amount $A_{>k}$ arrives). Within this relatively rare event of $A_{>k} \geq C(l)(t_j+d_j)$, however, the most likely pattern of arrival is close to the pattern of a nearly constant arrival rate of $A_{>k}/(t_j+d_j)$, which does not allow any lower-priority traffic to be served. Thus, with this kind of large-deviations excuse, it is reasonable to presume that, whenever $A_{>k} \geq C(l)(t_j+d_j)$, no low-priority traffic is served, and, in particular, the test packet is delayed more than $d_j$.

A more likely way of delaying the test packet more than $d_j$, however, is to share the burden of occupying the link. The effective service $S_k = C(l)(t_j+d_j) - A_{>k}$ available to priority class k during the interval $(-t_j, d_j]$, specifically, would be positive, but this service would be occupied by other class-k competitors of the test packet. Let $A_\tau$ be the amount of arrivals of type $\tau$ during the interval $(-t_j, 0]$. Similarly, let $A_{k-\tau}$ be the amount of traffic of priority class k, but outside type $\tau$, that arrives during the interval $(-t_j, d_j]$. So $A_{k-\tau}$ can be regarded as the "external" traffic of class k that competes with type $\tau$ and can contribute to the delay of the test packet, unless the WFQ weights mitigate the influence of this external traffic. Now, if $A_{k-\tau} \leq (1-w(\tau,l))S_k$, then there is at least a decent chance that all of $A_{k-\tau}$ can contribute to the delay of the test packet (unless individual classes $\tau'$ generate more than their share of the traffic). In a strict sense, one should consider all possible subsets of $T_k - \{\tau\}$, the set of WFQ types competing with type $\tau$, as the set of possible types whose every arrival contributes to the delay of the test packet (so the types in the complement have even greater arrivals, but these types in the complement contribute to the delay of the test packet only their fair share in proportion to $w(\tau',l)$). As a rougher approximation, however, one can imagine the event $D_j \geq d_j$ as arising mostly in just two ways: either $$A_\tau + A_{k-\tau} \geq S_k \& A_{k-\tau} \leq (1-w(\tau,l))S_k, \quad (6)$$

or $$A_\tau \geq w(\tau,l)S_k \& A_{k-\tau} > (1-w(\tau,l))S_k. \quad (7)$$

A complication arises in trying to estimate the joint probability of the combination (6) with the techniques that have been described so far. The problem is that the techniques estimate probabilities of the form of random variables being far above their means, but the combination (6) includes a condition of one random variable, $A_{k-\tau}$, being not too far above its mean. Recall now that the basic technique for estimating the probability $P(X \geq x)$ is with an exponential moment of the form $Ee^{p(X-x)}$ with $p \geq 0$. Naturally, the tightest bound of this form, that can be obtained on the probability, is to take p to minimize the expression $Ee^{p(X-x)}$. Letting $\Lambda_X(p) = \log(Ee^{pX})$, notice that the minimizing value of p is the one that makes $\Lambda_X'(p)=x$. It turns out that, if X is a sum of independent random variables $X_i$ and if each of these random variables has a continuous distribution (though this is not the situation of the analysis here), then the most likely values of the individual random variables $X_i$, given that the sum $X \geq x$, are given by $x_i = \Lambda_{X_i}'(p)$, where p is the minimizing value that makes $\Lambda_X'(p)=x$. The idea is to use this minimizing value of p to identify the most likely values of the components of a sum that is barely attaining a particular rare value.

Pursuing this idea, it is useful to introduce the following quantities. First, let $\mu'(p;t,\sigma,\rho) = \rho t e^{p(\sigma+\rho t)}$, the derivative of $\mu(p;t,\sigma,\rho)$ with respect to p. Then, let $x(p;t,\sigma,\rho) = \mu'(p;t,\sigma,\rho)/\mu(p;t,\sigma,\rho)$. Next, for any stream s', let $A_{s'}(p;t) = x(p;t,\sigma_{s'},\rho_{s'})$. Also, for any stream s', let H(s') be the set of links traversed by s'. Then, let $$A_\tau(p;l,t) = \sum_{s' \in S_\tau : l \in H(s')} A_{s'}(p;t),$$

$$A_{k-\tau}(p;l,t) = \sum_{\tau' \in T_k - \{\tau\}} \sum_{s' \in S_{\tau'} : l \in H(s')} A_{s'}(p;t),$$

and $$A_{>k}(p;l,t) = \sum_{k' \in K: k' > k} \sum_{\tau' \in T_{k'}} \sum_{s' \in S_{\tau'} : l \in H(s')} A_{s'}(p;t).$$

With the aid of these quantities, consider the event $A_\tau + A_{k-\tau} \geq S_k$, a basic event that occurs in the definition of the combination (6). Notice that this basic event is equivalent to $A_\tau + A_{k-\tau} + A_{>k} \geq C(l)(t_j+d_j)$. Let p be the corresponding minimizing value, the value that minimizes $Ee^{p[A_\tau + A_{k-\tau} + A_{>k} - C(l)(t_j+d_j)]}$, or, more precisely, the version of this expectation that is based on the on-off distributions for the individual streams making up the arrival quantities $A_\tau$, $A_{k-\tau}$, and $A_{>k}$. For this minimizing value p, make note of the corresponding values $A_{k-\tau}(p;l,t_j+d_j)$ and $A_{>k}(p;l,t_j+d_j)$, and check whether $$A_{k-\tau}(p;l,t_j+d_j) \leq (1-w(\tau,l))[C(l)(t_j+d_j) - A_{>k}(p;l,t_j+d_j)]. \quad (8)$$

If so, then the combination (6) makes the dominant contribution to $P(D_j \geq d_j)$; otherwise, the other combination (7) is the dominant contributor. In this way, one of these two contributors can be identified as the appropriate estimate of $P(D_j \geq d_j)$, at least if the quantities $d_j$ and $t_j$ are specified.

Now, if the second contributor turns out to be the dominant one, then that contributor is the probability of the intersection of two rare events, but these two events are dependent. So the probability of the intersection is not just the product of the probabilities. To handle the dependence, one must simply consider all relevant values a for the amount $A_{>k}$ that enters both of the conditions of (7). Of course, values a, that are below the mean $A_{>k}(0;t_j+d_j,l)$ of $A_{>k}$ are not relevant toward contributing the most likely situations for delaying the test packet more than $d_j$, so attention can be restricted to $a \geq A_{>k}(0;t_j+d_j,l)$. Now, given $A_{>k}=a \geq A_{>k}(0;t_j+d_j,l)$, the random variables $A_\tau$ and $A_{k-\tau}$ are independent. Accordingly, for a given value a of $A_{>k}$, which corresponds to $S_k(a)=C(l)(t_j+d_j)-a$, the usual techniques can be used to estimate $$P(A_\tau > w(\tau,l)S_k(a) \& A_{k-\tau} > (1-w(\tau,l))S_k(a)),$$

which is then the estimate for the conditional probability of $D_j > d_j$, given $A_{>k} = a$. Hence, multiplying by $P(A_{>k}=a)$, which is estimated by $P(A_{>k} \geq a)$ for $a \geq A_{>k}(0;t_j+d_j)$ in the large-deviations procedure, and then maximizing over a, one obtains the final estimate for $P(D_j \geq d_j)$, at least when based on the idea of the busy period having age $t_j$.

Of course, the age $t_j$ of the busy period could be anything, at least in principle. Continuing with the large-deviations idea of approximating the probability of a union with the maximum of the individual probabilities, the actual estimate of $P(D_j \geq d_j)$ should be the maximum, over all choices of $t_j \in [0,\infty)$ of the values obtained for each of these choices. Naturally, as was stated when the $D_j$ were introduced, the final estimate of $P(\Sigma_j D_j > \delta_s)$ is obtained by maximizing over all choices of the decomposition of $\delta_s$ into the components $d_j$.

It is convenient to introduce some auxiliary functions that represent various exponential moments for certain sums of on-off random variables that are taken to represent certain random arrivals. Explicitly, for any service type $\tau$, and any link $l \in L$, for any $p,t \geq 0$, let $$\mu_\tau(p; t, l) = \prod_{s \in S_\tau : l \in H(s)} \mu(p; t, \sigma_s, \rho_s).$$

Similarly, for any priority class $k \in K$, and any link $l \in L$, for any $p, t \geq 0$, let $$\mu_k(p; t, l) = \prod_{\tau \in T_k} \mu_\tau(p; t, l).$$

Next, for any $k \in K$, for any $l \in L$, for any $p, t \geq 0$, let $$\mu_{>k}(p; t, l) \prod_{k' \in K : k' > k} \mu_{k'}(p; t, l).$$

Finally, for any $k \in K$, for any $\tau \in T_k$ for any $l \in L$, for any $p, t \geq 0$, let $$\mu_{k-\tau}(p; t, l) = \prod_{\tau' \in T_k - \{\tau\}} \mu_{\tau'}(p; t, l).$$

Basically, $\mu_\tau(p;t_j,l)$ will be used to estimate $Ee^{pA_\tau}$, $\mu_{k-\tau}(p;t_j+d_j,l)$ will be used to estimate $Ee^{pA_{k-\tau}}$, and $\mu_{>k}(p;t_j+d_j,l)$ will be used to estimate $Ee^{pA_{>k}}$.

The next step is to introduce a certain combination of these quantities, where this combination would serve as the estimate of $P(D_j > d_j)$ if the contribution of (6) would turn out to be dominant. More precisely, for any $k \in K$, for any $\tau \in T_k$, for any $l \in L$, for any $p,t,d \geq 0$, let $$\tilde{\mu}_\tau(p;t,d,l) = \mu_\tau(p;t;l) \cdot \mu_{k-\tau}(p;t+d,l) \cdot \mu_{>k}(p;t+d,l)e^{-pC(l)(t+d)}.$$

Next, for any $k \in K$, for any $\tau \in T_k$, for any $l \in L$, for any $t,d \geq 0$, let $$p_\tau(t, d, l) = \arg \min_p \tilde{\mu}_\tau(p; t, d, l),$$

the value of p that minimizes $\tilde{\mu}_\tau(p;t,d,l)$. Naturally, the minimum value itself is then $\tilde{\mu}_\tau(t,d,l) = \tilde{\mu}_\tau(p_\tau(t,d,l);t,d,l)$. Now, the quantity, that summarizes whether the condition (8) holds, is $$\theta_\tau(t, d, l) = (1 - w(\tau, l))[C(l)(t + d) -$$

$$A_{>k}(p_\tau(t, d, l); l, t + d)] -$$

$$A_{k-\tau}(p_\tau(t, d, l); l, t + d).$$

Specifically, if $\Theta_\tau(t,d,l) \geq 0$, then $\mu_\tau(t,d,l)$ is to be used to estimate $P(D_j \geq d_j)$, at least when t is regarded as the age of the busy period.

To deal with the other possibility, however, some additional quantities must be introduced. First, corresponding to the idea of estimating $P(A_{>k}>a)$, define, for any $k \in K$, for any $l \in L$, for any $p,t \geq 0$, for any $a \geq A_{>k}(0;t,l)$, $\pi_{>k}(a;p,t,l) = \mu_{>k}(p;t,l)e^{pa}$. Then let $p_{>k}(a;t,l) = \arg \min \pi_{>k}(a;p,t,l)$, the minimizing value of p, so the minimum value itself is $\bar{\pi}_{>k}(a;t,l) = \pi_{>k}(a;t,l),t,l)$.

The next quantities are for estimating certain conditional probabilities. Thus, for any service type $\tau$, for any link $l \in L$, for any $p,t \geq 0$, and for any y, let $\pi_\tau(p;t,y,l) = \mu_\tau(p;t,l)e^{-py}$. Then, for any service type $\tau$, for any link $l \in L$, for any $t \geq 0$, and for any y, let $\bar{\pi}_\tau(t,y,l) = \min_p \pi_{(p;t,y,l)}$. Similarly, for any $k \in K$, for any $\tau \in T_k$, for any $l \in L$, for any $p,t \geq 0$, for any y, let $\pi_{k-\tau}(p;t,y,l) = \mu_{k-\tau}(p;t,l)e^{-py}$, and let $\bar{\pi}_{k-\tau}(t,y,l) = \min_p \pi_{k-\tau}(p;t,y,l)$.

The next step is to multiply these estimates of conditional and unconditional probabilities. Formally, for any $k \in K$, for any $\tau \in T_k$, for any $l \in L$, for any $t,d \geq 0$, for any $a \geq A_{>k}(0,t+d,l)$, let $$\tilde{\pi}_\tau(a, t, d, l) = \bar{\pi}_{k-\tau}(t + d, (1 - w(\tau, l))[C(l)(t + d) - a], l) \cdot$$

$$\bar{\pi}_\tau(t, w(\tau, l)[C(l)(t + d) - a], l) \cdot$$

$$\bar{\pi}_{>k}(a; t + d, l).$$

Then let $$\hat{\pi}_\tau(t, d, l) = \sup_{a \geq A_{>k}(0; l, t+d)} \tilde{\pi}_\tau(a, t, d, l).$$

The significance of this quantity is that, if $\Theta_\tau(t,d,l)<0$, then $\bar{\pi}_\tau(t,d,l)$ is to be used to estimate $P(D_j \geq d_j)$, at least when t is regarded as the age of the busy period.

The next step is to specify explicitly the version of the quantity that depends on $\Theta_\tau(t,d,l)$. Accordingly, for any service type $\tau$, for any link $l \in L$, for any $t, d \geq 0$, let $$q_\tau(t,d,l) = \begin{cases} \breve{\mu}_\tau(t,d,l) & \text{if } \theta_\tau(t,d,l) \geq 0 \\ \hat{\pi}_\tau(t,d,l) & \text{if } \theta_\tau(t,d,l) < 0. \end{cases}$$

The next step is to maximize over t. Thus, let $\bar{q}_\tau(d,l)=\sup_{r \geq 0} q_\tau(t,d,l)$, which is the estimate for $P(D_j > d_j)$ without any disclaimers about the age of the busy period.

Finally, for any service type $\tau$, for any stream $s \in S_\tau$, the estimate for the probability of the end-to-end queuing delay of stream s exceeding any delay $\delta > 0$ is given by $$\tilde{q}_s(\delta) = \sup_{d \in [0,\infty)^{H(s)} : \sum d = \delta\ 0 \leq j < H(s)} \prod \bar{q}_\tau(d_j, \lambda(j,s)).$$

In particular, the estimate for the probability of the end-to-end queuing delay of stream s exceeding $\delta_s$ is $\tilde{q}_s(\delta_s)$.

Taking into consideration that the on-line calculations in an admission-control procedure should be reasonably fast, the following is a simpler version of the calculation scheme. As with the GAD calculations, the idea is to introduce some isolating thresholds, with the purpose that the on-line computations during an admission decision should only be checking whether the admission of the new session would continue to respect the isolating thresholds, where the off-line computations, that determine the values for these thresholds, would be choosing these values in such a way that, as long as the thresholds are respected, all the admitted sessions would be receiving service that meets their standards. For definiteness, the isolating thresholds here will be the same as for the GAD case: for each priority class k, a bound $\alpha_k$ on the occupancy due to priority class k, and for each service type $\tau$, a bound $T_\tau$ on the burst times $\sigma_s/\rho_s$ of all the streams s admitted as type $\tau$. The on-line computations for admission control are then very quick, because they involve only two kinds of simple checks: first checking that a stream s requesting admission satisfies the burst-time bound $T_\tau$, and then checking that, for each hop on the stream's route, the relevant occupancy bound $\alpha_k$ continues to be respected at that hop. The next part of the discussion identifies the off-line computations that need to be done for dealing with the isolating thresholds $\alpha_k$ and $T_\tau$.

Mainly, the off-line computations here follow the same pattern as in the discussion above, except for a few modifications. Indeed, the principal change is to revise the definition of the function $\mu_\tau(p;t,l)$, that summarizes the type-d traffic arriving at a link $l \in L$, to reflect the fact that, in the off-line situation, one does not know the details of the individual streams. Instead, one only has the aggregate bounds. Accordingly, in this situation, the appropriate definition of the quantity is $\mu_\tau(p;t,l)=\mu(p,t,\alpha_k, w(\tau,l)C(l)T_\tau, \alpha_k w(\tau,l)C(l))$, where $k \in K$ is the priority class of service type $\tau$. Similarly, the analogous changes should be made to the definitions of $A_\tau(p;l,t)$, $A_{k-\tau}(p;l,t)$, and $A_{>k}(p;l,t)$. Explicitly, the revised definitions are the following.

$$A_\tau(p;l,t) = \frac{\partial}{\partial p}\log(\mu_\tau(p;t,l)),$$

$$A_{k-\tau}(p;l,t) = \sum_{\tau' \in T_k - \{\tau\}} A_{\tau'}(p;l,t), \text{ and}$$

$$A_{>k}(p;l,t) = \sum_{k' \in K} \sum_{\tau' \in T_{k'}} A_{\tau'}(p;l,t).$$

After these preliminary changes the rest of the calculations of the earlier discussion remain unchanged until after the quantities $\bar{q}_\tau(d,l)$ are identified, which basically characterize queuing delays at the individual links. At this point, the remaining task is to combine the link delays into end-to-end delays, which, in the earlier discussion, was represented by the calculation of the quantities $\tilde{q}_s(\delta_s)$ and the comparison with the targets $\epsilon_\tau$. Here, however, the individual streams s, that will be present at any one instant, are not known. Accordingly, the off-line computation must perform these comparisons for all possible routes. Overall, the full task for the off-line computation is to tune the isolating thresholds to be as "permissive" as possible, in the sense of tending to lead to the admission of more of the sessions that are likely to request admission, while missing none of the service targets for delay.

Some illustrative concrete calculations will now be presented, based on the statistical calculations that have just been described, where the values to be obtained for the isolating parameters $\alpha_k$ will turn out to differ from the values obtained in the earlier illustrative concrete calculations aiming at worst-case targets (and the differences will be in the direction of admitting more sessions). Yet, the meaning of these parameters as bounds on certain sums of the rate parameters of the streams being admitted to the network is the same. The calculations are for the same network as above, with one difference being the switch from worst-case targets for the service types to statistical targets for these same service types. Accordingly, the basic parameter values, that define the network environment, such as the link capacities $C(l)$, the delay targets $\delta_\tau$, and the bound h on the hop count of any route, will basically be the same with the one exception being that now, since some of the service targets are statistical, there will be some tolerances $\epsilon_\tau$ for the probabilities of missing the delay targets $\delta_\tau$.

Now, in a real network, the expectation is that deterministic targets will be employed for higher priorities, while statistical targets will be employed for lower priorities (except that the lowest priority would typically have no target at all). To illustrate the implications of the statistical calculations, the following discussion will be phrased as if all the higher-priority service types, EF, AF0, and AF1, have statistical targets. For definiteness, the corresponding tolerances will be taken to be $\epsilon_{EF}=10^{-6}$, $\epsilon_{AF0}=10^{-3}$, and $\epsilon_{AF1}=10^{-2}$, though the precise values will turn out not to matter in the calculations to be presented here. If the above calculations were followed in complete detail, then the resulting values for the occupancy thresholds $\alpha_k$ would depend on the tolerances $\epsilon_\tau$, and, as long as the sum of the occupancy thresholds remained below the value 1, the thresholds would rise as the tolerances rose. Yet, the complexity of the calculations would tend to hide the main point to be made here that, by adopting the statistical approach, one can "justify" the admission of more sessions. Indeed, this point can be made with a simplification of the detailed calculations, so it is this simplified calculation that will be followed here, even though the simplified calculation ignores the values of the tolerances $\epsilon_\tau$.

Basically, the simplified calculation is just the application of the more detailed calculation to the special case of zero values for all the tolerances. So occupancy thresholds $\alpha_k$, that are adequate according to the simplified calculation, will certainly be adequate for satisfying strictly positive tolerances. The simplification of this special case of zero tolerances is that, instead of dealing with all the minima, maxima, and exponential moments, one can simply deal with worst cases. In contrast to the earlier worst-case calculations for GADs, however, the simplified "worst-case" calculations here inherit the assumption of no growth in a stream's burstiness as it traverses its route. Thus, it is this assumption that allows the statistical calculations to "justify" the admission of more streams for the special case of zero tolerances, where these calculations are equivalent to the version of worst-case calculations that assume that there is no growth in burstiness along a stream's route.

Now, for the network being considered, the point to be made by these calculations is that the statistical calculations can justify raising the isolating thresholds from $\alpha_{EF}=0.1$ and $\alpha_{AF}=0.06$ to, say, $\alpha_{EF}=0.5$ and $\alpha_{AF}=0.38$. Ultimately, of course, one has the possibility of raising one at the cost of dropping the other, so the values just identified can be changed to adapt to different expectations for the traffic mix to be served. As for establishing the adequacy of these values, under the assumption of burstiness parameters that are impervious to queuing variations, consider first the implications for the high-priority EF traffic. Under the assumptions being imposed, the EF traffic, that can arrive at any given link l, can have a burst of size no greater than $\alpha_{EF}C(l)T_{EF}$. Thus, as long as $\alpha_{EF} \leq 1$, so that high-priority queues cannot grow any greater than would be produced by a maximal burst, the maximum queuing delay that can be suffered by an EF packet at a link l is no greater than $\alpha_{EF}C(l)T_{EF}/C(l)=\alpha_{EF}T_{EF}$, where use is made here of the further assumption in the statistical calculations that no leftover low-priority packet can contribute any delay to higher-priority traffic. Evidently, with the choices of the parameter values for the network, the maximal end-to-end delay for an EF packet is bounded, in milliseconds, by $\hat{\Delta}+h(\alpha_{EF}T_{EF}+J)=10.004+20\alpha_{EF}$ which is always less than $\delta_{EF}=125$ ms, as long as $\alpha_{EF} \leq 1$. In particular, the EF service target is met with the value $\alpha_{EF}=0.5$ advertised above.

The analysis for the lower-priority AF service types is more complicated. Suppose a "test" packet of some AF type τ arrives at a link l at time 0 as part of a burst of type-τ traffic, along with a burst of EF traffic, suppose that this burst begins a busy period for the link in which all the traffic streams are generating traffic at the rates given by their rate parameters, and suppose that the test packet loses all the "tie-breaking" procedures to all the competing packets in the initial burst. This is the situation that creates the greatest delay for the test packet, assuming that the link is not "oversubscribed", i.e. as long as $\alpha_{EF}+\alpha_{AF} \leq 1$. Of course, the link spends the initial phase of the busy period serving EF traffic alone. The size of the initial burst of EF traffic could be as large as $\alpha_{EF}C(l)T_{EF}$, and with further EF traffic arriving at rate $\alpha_{EF}C(l)$, this initial phase could last as long as $$\hat{D}_{>AF} = \frac{\alpha_{EF}C(l)T_{EF}}{C(l)-\alpha_{EF}C(l)} = \frac{\alpha_{EF}T_{EF}}{1-\alpha_{EF}}.$$

After this phase, the link can serve the lower-priority type-τ traffic, but, if the EF traffic continues to arrive at its maximal allowed rate, and if the other AF service type occupies its share of the link's remaining capacity, then the link will be delivering service to the type-τ traffic at rate $w(\tau,l)C(l)(1-\alpha_{EF})$. In particular, the initial burst of type-τ traffic, of size no greater than $\alpha_{AF}C(l)T_\tau$, will have been served within a time $$\frac{\alpha_{AF}C(l)T_\tau}{w(\tau,l)C(l)(1-\alpha_{EF})} = \frac{\alpha_{AF}T_\tau}{w(\tau,l)(1-\alpha_{EF})}$$

after $\hat{D}_{>AF}$. Since the test packet is part of this burst, the maximum delay, that a type-τ packet could experience on a single link, is bounded by $$\hat{D}_{>AF} + \frac{\alpha_{AF}T_\tau}{w(\tau,l)(1-\alpha_{EF})} = \frac{\alpha_{EF}T_{EF}}{1-\alpha_{EF}} + \frac{\alpha_{AF}T_\tau}{w(\tau,l)(1-\alpha_{EF})};$$

provided that $\alpha_{EF}+\alpha_{AF} \leq 1$.

The next step is to use this information to identify bounds on end-to-end delays for AF traffic. First, for a particular type τ of AF traffic, the maximal end-to-end delay in milliseconds is $$\hat{D}_\tau = \hat{\Delta} + h\left[\bar{J} + \frac{\alpha_{EF}T_{EF}}{1-\alpha_{EF}} + \frac{\alpha_{AF}T_\tau}{w(\tau,l)(1-\alpha_{EF})}\right]$$
$$= 30.004 + \frac{20\alpha_{AF}T_\tau}{w(\tau,l)},$$

where use has been made of the known parameter values, including the choice $\alpha_{EF}=0.5$. In particular, $$\hat{D}_{AF0} = 30.004 + \frac{200\alpha_{AF}}{0.6}, \text{ while}$$

$$\hat{D}_{AF1} = 30.004 + \frac{1000\alpha_{AF}}{0.4} = 30.004 + 2500\alpha_{AF}.$$

On the basis of these expressions, one can choose $\alpha_{AF}$ appropriately. First, notice that $\hat{D}_{AF0} \leq 500 = \delta_{AF0}$ as long as $\alpha_{AF} \leq 1$. On the other hand, $\hat{D}_{AF1}$ needs $\alpha_{AF}$ to be rather smaller to avoid exceeding $\delta_{AF1}=1000$ ms. Indeed, $\alpha_{AF}$ has to be strictly smaller than 0.4. In particular, the value $\alpha_{AF}=0.38$ advertised above is adequate. One point to notice, however, is that, at least when $\alpha_{EF}$ is as high as 0.5, the value of $\alpha_{AF}$ must be restricted to be so small as not fully to occupy the link, in the sense that $\alpha_{AF}+\alpha_{EF}$ must be strictly smaller than 1. The more important point, though, is that based on the statistical calculations, one can "justify" raising the occupancy bounds significantly (to $\alpha_{EF}=0.5$ and $\alpha_{AF}=0.38$ in this example from the values $\alpha_{EF}=0.1$ and $\alpha_{AF}=0.06$ that could be justified by the worst-case calculations).

FIG. 1 is a flow diagram illustrating operations performed at a device in accordance with a representative embodiment. Additional, fewer, or different operations may be performed depending on the particular implementation. In addition, the operations may be performed in an alternative order depending on the particular embodiment. In an operation 100, a request for a new session in a communications network is received at the device. In an embodiment, the request includes a priority class, a service type, and session characteristics. In an operation 110, an occupancy threshold value associated with the priority class is identified. A burst time threshold value associated with the priority class and the service type is identified in an operation 120. In a representative embodiment, both the occupancy threshold value and the burst time threshold value are predetermined. In an operation 130, a target delay threshold value associated with the priority class and the service type is identified. In an operation 140, an end-to-end delay value is calculated based on the identified occupancy threshold value, the burst time threshold value, and the session characteristics. In an operation 150, the calculated end-to-end value is compared with the identified target delay threshold value to determine if a delay threshold is satisfied. In an operation 160, the new session in the communications network is admitted if the delay threshold is satisfied.

Figure 2:
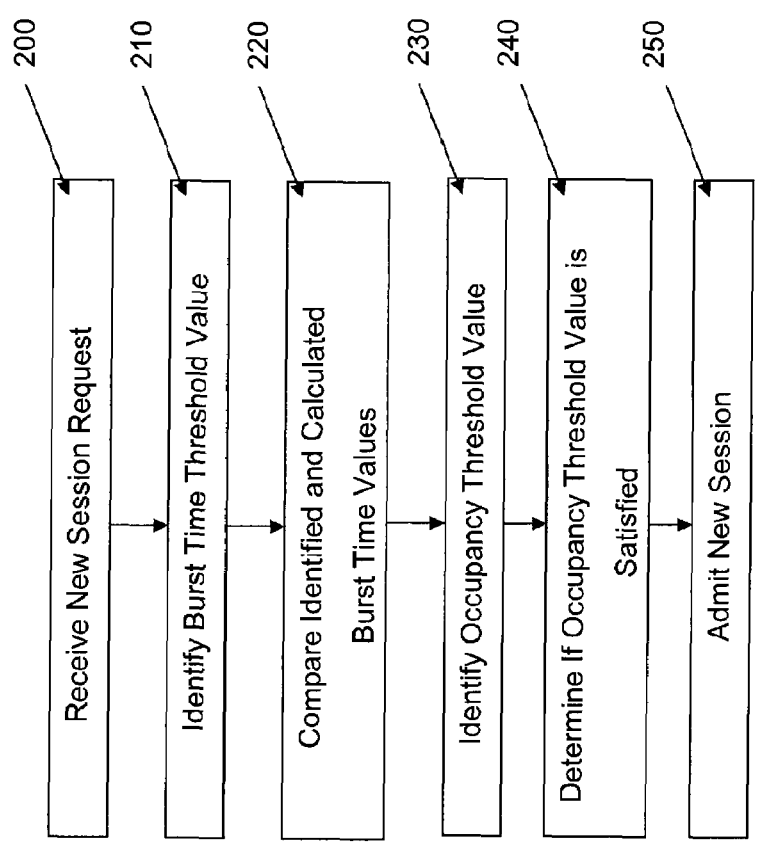
FIG. 2 is a flow diagram illustrating operations performed at a device in accordance with a representative embodiment.

FIG. 2 is a flow diagram illustrating operations performed at a device in accordance with a representative embodiment. Additional, fewer, or different operations may be performed depending on the particular implementation. In addition, the operations may be performed in an alternative order depending on the particular embodiment. In an operation 200, a request for a new session in a communications network is received at the device. In a representative embodiment, the request includes a priority class, a service type, and session characteristics. A burst time threshold value associated with the priority class and the service type is identified in an operation 210. In an operation 220, a burst time value calculated for the new session based on the session characteristics is compared with the identified burst time threshold value to determine if a burst time threshold is satisfied. An occupancy threshold value associated with the priority class is identified in an operation 230. In a representative embodiment, both the identified occupancy threshold value and the identified burst time threshold value are predetermined. In an operation 240, it is determined if the identified occupancy threshold value is satisfied at each hop on a route identified for the new session based on the session characteristics. In an operation 250, the new session in the communications network is admitted if the burst time threshold is satisfied and the identified occupancy threshold value is satisfied at each hop.

While there has been described a method of calculating admission control in an internet protocol network, it will be apparent to those skilled in the art that modifications and variations are possible without deviating from the teachings and broad scope of the present invention which shall be limited solely by the scope of the claims appended hereto.

What is claimed is:

1. A method for providing admission control in a communications network, the method comprising:
    at a first device,
    receiving a request for a new session in a communications network, the request comprising a priority class, a service type, and session characteristics;
    identifying an occupancy threshold value associated with the priority class, wherein the occupancy threshold value is predetermined;
    identifying a burst time threshold value associated with the priority class and the service type, wherein the burst time threshold value is predetermined;
    identifying a target delay threshold value associated with the priority class and the service type;
    calculating an end-to-end delay value based on the identified occupancy threshold value, the burst time threshold value, and the session characteristics;
    comparing the calculated end-to-end delay value with the identified target delay threshold value to determine if a delay threshold is satisfied; and
    admitting the new session in the communications network if the delay threshold is satisfied.

2. The method of claim 1, further comprising rejecting the new session if the delay threshold is not satisfied.

3. The method of claim 1, further comprising:
    identifying a target delay variation threshold value associated with the priority class and the service type;
    calculating an end-to-end delay variation value based on the identified occupancy threshold value, the burst time threshold value, and the session characteristics;
    comparing the calculated end-to-end delay value variation with the identified target delay variation threshold value to determine if a delay variation threshold is satisfied; and
    admitting the new session in the communications network if the delay variation threshold is satisfied.

4. The method of claim 3, further comprising rejecting the new session if the delay variation threshold is not satisfied.

5. The method of claim 3, wherein the occupancy threshold value is predetermined to insure that a worst case end-to-end delay variation value satisfies the delay variation threshold for all service types.

6. The method of claim 3, wherein the occupancy threshold value is predetermined to insure that a statistical end-to-end delay variation value satisfies the delay variation threshold for all service types.

7. The method of claim 3, wherein the occupancy threshold value for a first priority class is predetermined to insure that a worst case end-to-end delay variation value satisfies the delay variation threshold for all service types, and further wherein the occupancy threshold value for a second priority class is predetermined to insure that a statistical end-to-end delay variation value satisfies the delay variation threshold for all service types.

8. The method of claim 1, wherein the calculated end-to-end delay value includes a delay value resulting from a higher priority class of the priority class.

9. The method of claim 8, wherein the calculated end-to-end delay value includes a second delay value resulting from a higher service type of the service type.

10. The method of claim 1, wherein the occupancy threshold value is predetermined to insure that a worst case end-to-end delay value satisfies the delay threshold for all service types.

11. The method of claim 1, wherein the occupancy threshold value is predetermined to insure that a statistical end-to-end delay value satisfies the delay threshold for all service types.

12. The method of claim 1, wherein the occupancy threshold value for a first priority class is predetermined to insure that a worst case end-to-end delay value satisfies the delay threshold for all service types, and further wherein the occupancy threshold value for a second priority class is predetermined to insure that a statistical end-to-end delay value satisfies the delay threshold for all service types.

13. A method for providing admission control in a communications network, the method comprising:
    at a first device,
    receiving a request for a new session in a communications network, the request comprising a priority class, a service type, and session characteristics;
    identifying a burst time threshold value associated with the priority class and the service type, wherein the burst time threshold value is predetermined;
    comparing a burst time value calculated for the new session based on the session characteristics with the identified burst time threshold value to determine if a burst time threshold is satisfied;

identifying an occupancy threshold value associated with the priority class, wherein the occupancy threshold value is predetermined;

determining if the identified occupancy threshold value is satisfied at each hop on a route identified for the new session based on the session characteristics; and admitting the new session in the communications network if the burst time threshold is satisfied and the identified occupancy threshold value is satisfied at each hop.

14. The method of claim 13, further comprising calculating the occupancy threshold value.

15. The method of claim 14, wherein calculating the occupancy threshold value for a first priority class comprises:

identifying a target delay threshold value associated with the first priority class and the service type;

calculating a worst case end-to-end delay variation value; and selecting a value for the occupancy threshold value for the first priority class such that the calculated worst case end-to-end delay variation value satisfies the identified target delay threshold value.

16. The method of claim 15, wherein calculating the occupancy threshold value for a second priority class comprises:

identifying a second target delay threshold value associated with the second priority class and the service type;

calculating a statistical end-to-end delay variation value; and selecting a second value for the occupancy threshold value for the second priority class such that the calculated statistical end-to-end delay variation value satisfies the identified second target delay threshold value.

17. The method of claim 14, wherein calculating the occupancy threshold value comprises:

identifying a target delay threshold value associated with the priority class and the service type;

calculating a statistical end-to-end delay variation value; and selecting a value for the occupancy threshold value such that the calculated statistical end-to-end delay variation value satisfies the identified target delay threshold value.

* * * * *